United States Patent
Choy et al.

(10) Patent No.: US 9,689,453 B2
(45) Date of Patent: Jun. 27, 2017

(54) ACTIVE VIBRATION ABSORBER

(71) Applicants: Ping Kong Choy, Kwai Chung (HK);
Jinchun Huang, Kwai Chung (HK);
Xianghua Xing, Kwai Chung (HK);
Hoi Yue Yung, Kwai Chung (HK)

(72) Inventors: Ping Kong Choy, Kwai Chung (HK);
Jinchun Huang, Kwai Chung (HK);
Xianghua Xing, Kwai Chung (HK);
Hoi Yue Yung, Kwai Chung (HK)

(73) Assignee: ASM TECHNOLOGY SINGAPORE PTE. LTD., Singapore (SG)

( * ) Notice: Subject to any disclaimer, the term of this patent is extended or adjusted under 35 U.S.C. 154(b) by 220 days.

(21) Appl. No.: 14/174,349

(22) Filed: Feb. 6, 2014

(65) Prior Publication Data

US 2015/0219176 A1 Aug. 6, 2015

(51) Int. Cl.
*F16F 7/10* (2006.01)
*F16F 7/104* (2006.01)
*F16F 15/03* (2006.01)
*F16F 7/108* (2006.01)

(52) U.S. Cl.
CPC ............ *F16F 7/1011* (2013.01); *F16F 7/104* (2013.01); *F16F 7/108* (2013.01); *F16F 15/03* (2013.01); *F16F 15/035* (2013.01)

(58) Field of Classification Search
CPC .......... F16F 7/1011; F16F 7/104; F16F 7/108; F16F 15/03; F16F 15/035
USPC ...... 310/12.05; 188/378, 379; 248/638, 636, 248/559, 562; 267/140.11, 140.15
See application file for complete search history.

(56) References Cited

U.S. PATENT DOCUMENTS

| | | | | |
|---|---|---|---|---|
| 3,088,062 A | * | 4/1963 | Hudimac | F16F 6/00 188/1.11 E |
| 4,976,415 A | * | 12/1990 | Murai | B23Q 11/0032 188/378 |
| 5,811,821 A | * | 9/1998 | Alexander | F16F 15/02 248/550 |
| 5,931,441 A | * | 8/1999 | Sakamoto | F16F 15/02 248/550 |
| 6,018,689 A | * | 1/2000 | Kumura | F16F 15/02 381/71.12 |
| 6,036,162 A | * | 3/2000 | Hayashi | F16F 15/00 248/550 |
| 6,758,312 B2 | * | 7/2004 | Heiland | F16F 15/08 188/378 |
| 6,949,845 B2 | * | 9/2005 | Oisugi | H02K 41/03 310/12.05 |

(Continued)

*Primary Examiner* — Thomas Irvin
(74) *Attorney, Agent, or Firm* — Ostrolenk Faber LLP

(57) ABSTRACT

An active vibration absorber is attachable to a structure incorporating a positioning system which serves to vibrate the structure during its operation. The active vibration absorber comprises a mounting portion for attachment to the structure, an inertial mass that is resiliently coupled to the mounting portion and a force actuator which is operative to controllably move the inertial mass relative to the mounting portion. The force actuator is configured to move the inertial mass relative to the mounting body according to a motion profile during a motion cycle of the positioning system in order to attenuate vibrations in the structure. The motion profile is determined from a motion command which is operative to drive the positioning system during the motion cycle.

20 Claims, 2 Drawing Sheets

(56) References Cited

U.S. PATENT DOCUMENTS

| | | | | |
|---|---|---|---|---|
| 7,370,829 | B2* | 5/2008 | Badre-Alam | B64C 27/001 180/312 |
| 7,383,929 | B2* | 6/2008 | Korenaga | F16F 15/03 188/267 |
| 7,808,133 | B1* | 10/2010 | Widdowson | H02K 41/03 310/12.05 |
| 8,800,736 | B2* | 8/2014 | Kashani | F16F 15/0275 188/379 |
| 2002/0104950 | A1* | 8/2002 | Mayama | G03F 7/709 248/638 |
| 2007/0131504 | A1* | 6/2007 | Bronowicki | F16F 15/035 188/378 |
| 2007/0284794 | A1* | 12/2007 | Heiland | F16F 15/02 267/140.11 |
| 2008/0106015 | A1* | 5/2008 | Fushimi | F16F 15/08 267/140.15 |
| 2009/0294234 | A1* | 12/2009 | Kashani | F16F 15/0275 188/379 |
| 2011/0033310 | A1* | 2/2011 | Badre-Alam | F16F 1/185 416/155 |
| 2011/0209958 | A1* | 9/2011 | Badre-Alam | F16F 1/185 188/379 |
| 2012/0217108 | A1* | 8/2012 | Muragishi | F16F 7/1005 188/379 |
| 2012/0241268 | A1* | 9/2012 | Laro | F16F 15/03 188/379 |
| 2013/0311012 | A1* | 11/2013 | Black | B64C 27/001 701/3 |

* cited by examiner

ACTIVE VIBRATION ABSORBER

FIELD OF THE INVENTION

The invention relates to an assembly for damping vibrations in structures having moving parts, and in particular, for damping vibrations caused by positioning devices of semiconductor processing machines.

BACKGROUND AND PRIOR ART

Vibration absorbers are commonly used in diverse industries to reduce the level of vibration in a variety of structures. For instance, a passive vibration absorber is a simple and effective device which is widely used to suppress undesirable machine vibrations excited by harmonic forces.

One classic form of passive vibration absorber has a mass-spring-damper configuration, which consists of a small absorber mass connected to a primary system of a vibrating structure by a spring and/or a damper. Typically, the vibration absorber is designed to have spring and mass parameters that give it the same resonance frequency as the vibrating structure. As a result, the inertia of the vibration absorber can reduce the net force on the primary system, hence attenuating the vibrations at this frequency. The vibration absorber effectively adds a large impedance to the primary system.

However, such passive vibration absorbers are generally only effective over a narrow frequency range. When the excitation frequency varies widely, the vibration attenuation effect of the vibration absorber would decrease rapidly due to frequency mistuning. Therefore, passive vibration absorbers are not effective or become inapplicable in many applications with varying excitation frequencies.

One conventional approach to solving this problem was the development of adaptive or active vibration absorbers to expand the effective operational bandwidth. Active vibration absorbers can improve vibration attenuation by adjusting their own vibrating frequencies to track the changing excitation frequency. In an active vibration absorber, an active force component is controlled by an active control system and is positioned between the absorber mass and the primary system of a vibrating structure. This device provides adaptability and improved performance in some areas of vibration control. Active control has been used effectively with lightweight actuators such as piezoelectric materials. Heavier and more powerful electromagnetic actuators have proven to be effective on heavier structures and systems.

On the other hand, adaptive vibration absorbers use the technique of altering their design parameters automatically to control their resonance frequency to match that of the primary system of a vibrating structure. In one example, the absorber resonance frequency is tuned by changing a spring stiffness of a dampener using a stepper motor. Along with actuator design, a lot of research in active control comprises the investigation of different control strategies used for actuation: neural networks, delayed resonator, modal feedback controller, and disturbance cancellation. For example, the delayed resonator utilizes feedback regarding positions of the absorber with a controlled time delay to push the absorber to resonate at the same frequency as the excitation.

For semiconductor processing machines such as wire bonders, machine vibrations demonstrate characteristics of varying excitation frequencies (or motion cycle times) within a relatively large range, and the excitation frequencies tend to change very frequently.

For the adaptive vibration absorbers that use motors to adjust spring stiffness with feedback control algorithms, slow adjustment time and poor reliability under extended operations make them impractical for use in semiconductor processing machines.

Conventional active vibration absorbers use sensors to monitor excitation frequency and to monitor the vibration of the absorbers themselves and/or their primary system. After processing the monitored information, a feedback control signal is generated to produce a force which acts on the vibration absorber. As a result, the vibration absorber vibrates and damps the vibration of primary system at the monitored excitation frequency. However, this approach has several drawbacks if used in semiconductor processing machines. First, it requires a relatively long time for data processing (usually involving Fast Fourier Transform or "FFT" processing) as compared to motion cycle time. Due to the nature of feedback control, the whole system has a long transient time and poor transient performance for fast varying excitation frequencies. Furthermore, it generally requires several sensors to collect vibration signals, increasing the costs of adopting this approach. If the absorption of more than one frequency is required, typically more than one vibration absorber or a vibration absorber with multiple degrees of freedom is required.

Therefore, in order for a vibration absorber to be useful in semiconductor processing machines, it must be tunable to a range of excitation frequencies and this tuning must be fast enough to respond to varying excitation frequencies during operation. It would be better to use motion commands of the primary system itself instead of signals from separate sensors to generate control signals. It would also be preferable that the use of one vibration absorber be effective to reduce vibration in more than one frequency and the vibration absorber is capable of working along more than one axis (for example, in both x and y directions).

SUMMARY OF THE INVENTION

It is thus an object of the invention to seek to provide an active vibration absorber that is tunable to a range of excitation frequencies. It is an associated object of the invention to seek to provide a vibration absorber that functions fast enough to track varying excitation frequencies in a vibrating structure in order to absorb the vibrations correspondingly.

According to a first aspect of the invention, there is provided an active vibration absorber comprising: a mounting portion that is attachable to a structure, the structure incorporating a positioning system which serves to vibrate the structure during its operation; an inertial mass that is resiliently coupled to the mounting portion; and a force actuator which is operative to controllably move the inertial mass relative to the mounting portion; wherein the force actuator is configured to move the inertial mass relative to the mounting body according to a motion profile during a motion cycle of the positioning system in order to attenuate vibrations in the structure, the motion profile being determined from a motion command which is operative to drive the positioning system during the motion cycle.

According to a second aspect of the invention, there is provided a method for attenuating vibrations in a structure, comprising the steps of: attaching an active vibration absorber as claimed in claim 1 to the structure; receiving with a processor the motion command sent to the positioning system for driving the positioning system during the motion cycle; determining a motion profile of the inertial mass relative to the mounting portion; and thereafter controlling the inertial mass to move relative to the mounting portion according to the motion profile that has been determined.

According to a third aspect of the invention, there is provided a semiconductor processing apparatus, comprising: a processing station incorporating a positioning system which serves to vibrate the processing station during its operation; an active vibration absorber having a mounting portion that is attachable to the processing station and an inertial mass that is resiliently coupled to the mounting portion; and a force actuator which is operative to controllably move the inertial mass relative to the mounting portion; wherein the force actuator is configured to move the inertial mass relative to the mounting body according to a motion profile during a motion cycle of the positioning system in order to attenuate vibrations in the processing station, the motion profile being determined from a motion command which is operative to drive the positioning system during the motion cycle.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

Examples of active vibration absorbers in accordance with the invention will now be described with reference to the accompanying drawings, in which.

DETAILED DESCRIPTION OF THE PREFERRED EMBODIMENT OF THE INVENTION

Figure 1:
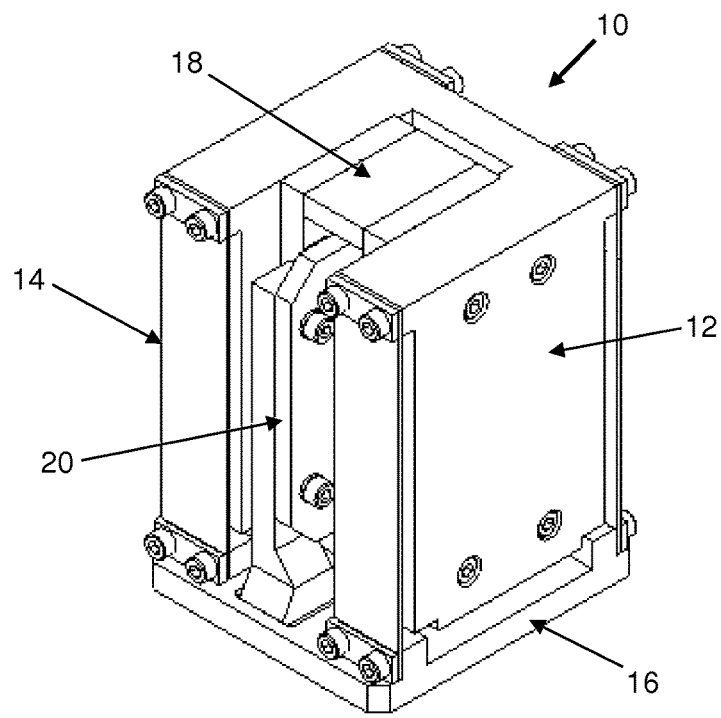
FIG. 1 is an isometric view of a single-axis active vibration absorber according to a first preferred embodiment of the invention.

FIG. 1 is an isometric view of a single-axis active vibration absorber 10 according to a first preferred embodiment of the invention.

The single-axis active vibration absorber 10 generally comprises an inertial mass 12 which is used to attenuate the vibrations of a structure, such as a processing machine, to which it is attached. Resilient elements, such as leaf springs 14, are attached to the inertial mass 12. For instance, one end of the leaf spring 14 is affixed to a top end portion of the inertial mass 12 and an opposite end portion of the leaf spring 14 is affixed to a mounting portion in the form of an absorber base 16 below the inertial mass 12. The absorber base 16 attaches the active vibration absorber 10 to a surface of the processing machine for which vibration is sought to be attenuated. The leaf springs 14 resiliently coupling the inertial mass 12 and the absorber base 16 may be attached to the inertial mass 12 and absorber base 16 respectively using screws. The leaf springs 14 are positioned between the inertial mass 12 and absorber base 16 so to elastically support the inertial mass 12 relative to the absorber base 16. This enables the inertial mass 12 to move relative to the absorber base 16.

Moreover, there is a force actuator connected to the inertial mass 12 to cause the inertial mass 12 to move controllably relative to the absorber base 16. The force actuator may be a linear motor, comprising a permanent magnet 18 attached to the inertial mass 12 and a coil 20 attached to the absorber base 16, such that the permanent magnet 18 and coil 20 are movable relative to each other via electromagnetic interaction. Conversely, the permanent magnet 18 may be attached to the absorber base 16 and the coil 20 attached to the inertial mass 12.

The linear motor is operable to drive the inertial mass 12 to vibrate and resonate at desired frequencies relative to the absorber base 16. In this embodiment, the force actuator is configured to move the inertial mass 12 relative to the absorber base 16 only along a single axis.

Figure 2:
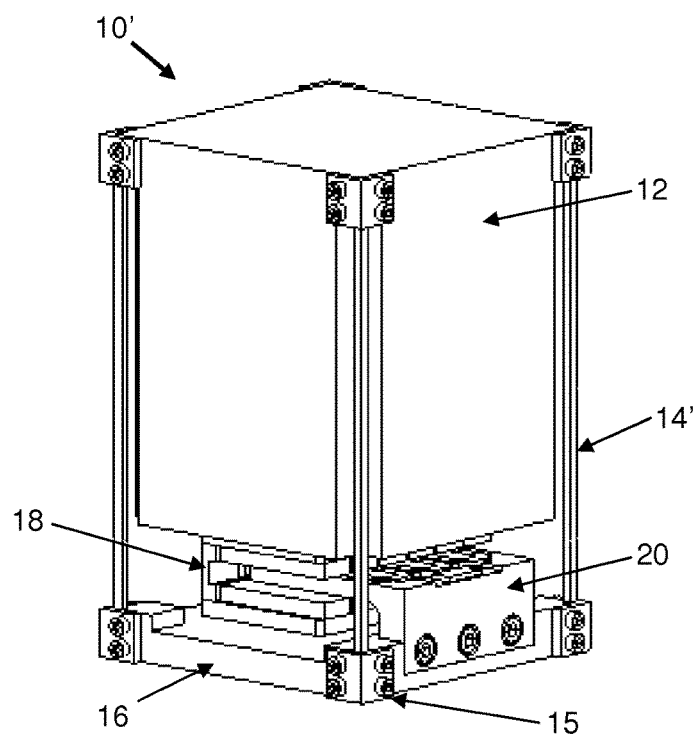
FIG. 2 is an isometric view of a dual-axis active vibration absorber according to a second preferred embodiment of the invention.

FIG. 2 is an isometric view of a dual-axis active vibration absorber 10' according to a second preferred embodiment of the invention. In this embodiment, the active vibration absorber 10' is capable of reducing vibrations in two directions (for example, in both the x and y axes) simultaneously.

The dual-axis active vibration absorber 10' according to the second preferred embodiment generally comprises an inertial mass 12 which is used to attenuate the vibrations of a processing machine to which it is attached. Resilient elements, which may be in the form of flexible columnar supports 14', are generally attached to the inertial mass 12 at four corners of the inertial mass 12 using L-brackets 15. Each flexible columnar support 14' may have a square cross-section. A main body of each flexible columnar support 14' is spaced from the inertial mass 12 so as to flexibly support the inertial mass 12. One end portion of each flexible columnar support 14' is affixed to a top portion of the inertial mass 12 and an opposite end portion of each flexible columnar support 14' is affixed to a respective corner of the absorber base 16 located below the inertial mass 12. The flexible columnar supports 14' are positioned between the inertial mass 12 and absorber base 16 so as to elastically support the inertial mass 12 relative to the absorber base 16 along two orthogonal axes. This enables the inertial mass 12 to move relative to the absorber base 16 along the two orthogonal axes.

It can be observed that the coil 20 is mounted to the absorber base 16, and the permanent magnet 18 is mounted to the inertial mass 12. The permanent magnet 18 is movable relative to the coil 20. The flexible columnar supports 14' elastically support the inertial mass 12 as the latter moves relative to the absorber base 16 along dual axes that are orthogonal to each other.

In this case, the linear motor is drivable to move along two axes rather than in only one axis as described in relation to the first preferred embodiment. The linear motor may be a single dual-axis planar motor, such as that described in U.S. Pat. No. 7,808,133. Such a linear motor may drive the permanent magnet 18 to move relative to the coil 20 in two axes along a plane, so as to be capable of attenuating vibration along two orthogonal axes simultaneously.

By design, the inertial mass 12 is much smaller than a mass of a primary system of a vibrating structure, such as a processing machine, for which vibrations are sought to be attenuated. The inertial mass 12 and stiffness of the leaf springs 14 (or flexible columnar support 14') determine the resonance frequency of the active vibration absorber 10, 10'. The absorber base 16 is mounted onto a surface of the processing machine. The linear motor is then used to drive the inertial mass 12 to vibrate and resonate at desired frequencies relative to the absorber base 16. No sensor is needed during normal operation of the active vibration absorber 10, 10', as the active vibration absorber proactively attenuates vibration based on an expected force that will be experienced by the processing machine during a next operation cycle.

The working frequency of the active vibration absorber 10, 10' may be adjusted by setting appropriate force amplitudes and time-delays for activation of the linear motor and these should generally relate to motion commands which are given by the processing machine. The force amplitude and time-delay of the linear motor are determined by a processor electrically connected to the active vibration absorber 10, 10' and the motion command (motion cycle time and maximum acceleration) of the processing machine. Therefore, these parameters can be predetermined by simulation and/or by testing during calibration to create a reference or look-up table for real-time tuning during actual operation of the processing machine.

Figure 3:
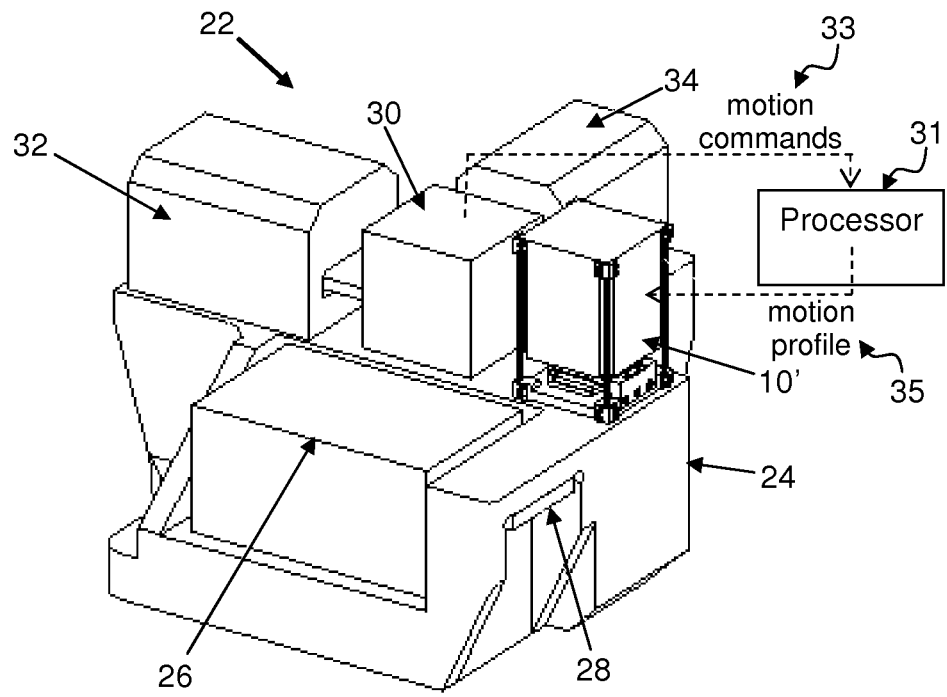
FIG. 3 is an isometric view of a processing machine on which the dual-axis active vibration absorber according to the second preferred embodiment of the invention has been mounted.

FIG. 3 is an isometric view of a processing machine 22 on which the dual-axis active vibration absorber 10' according to the second preferred embodiment of the invention has been mounted. The processing machine may be any semiconductor processing machine which may experience vibrational forces from its moving parts when in operation, such as a wire bonder or die bonder.

The processing machine 22 schematically illustrated in FIG. 3 is a wire bonder, which generally comprises a casting base 24 and a workholder 26. The workholder 26 is operative to hold a lead frame device (not shown) during wire bonding. The casting base 24 rests on a larger support platform via a resilient isolator 28 for isolating the casting base 24 from external vibrations. A bonding tool (not shown) is controlled by a positioning system, which may be in the form of an x-y stage 30 which is operative to move the bonding tool in orthogonal x and y directions during wire bonding operations. The x-y stage 30 is connected respectively to an x motor 32 and a y motor 34 to drive the motion of the bonding tool. As illustrated, the active vibration absorber 10' is mounted on top of the casting base 24, but it should be appreciated that the active vibration absorber 10' may be mounted to the casting base 24 at other positions depending on design requirements.

During operation, appropriate tuning parameters of the linear motor (comprising the permanent magnet 18 and coil 20) are obtained from referencing motion commands 33 that are fed to the x-y stage 30 of the processing machine 22 and a predetermined reference or look-up table that is created during calibration of the active vibration absorber 10' mounted on the processing machine 22. Based on these parameters that are used to drive the x-y stage 30, a motion controller drives the linear motor with an appropriate sinusoidal or other oscillating signal according to a motion profile 35 that has been determined by the processor 31. The required motion profile 35 is based upon an expected force that would be experienced by the structure of the processing machine 22 caused by the motion command 33 during the motion cycle. A period of this sinusoidal or other oscillating signal driven by the force actuator should be approximately equal to an operation cycle time of the processing machine 22, for example, a bonding cycle time.

A start of the movement of the linear motor incorporates a time delay relative to a start of a motion associated with the processing machine 22 and its force amplitude is also adjusted by the processor 31 accordingly. In this way, the active vibration absorber 10' resonates at an excitation frequency that is related to the motion of the processing machine 22. The active vibration absorber 10' is operative to exert a force on the processing machine 22 to cancel the reaction force acting on the processing machine 22. Therefore, vibration of the processing machine 22 can be significantly reduced. The above process is then repeated for the next motion cycle.

Figure 4:
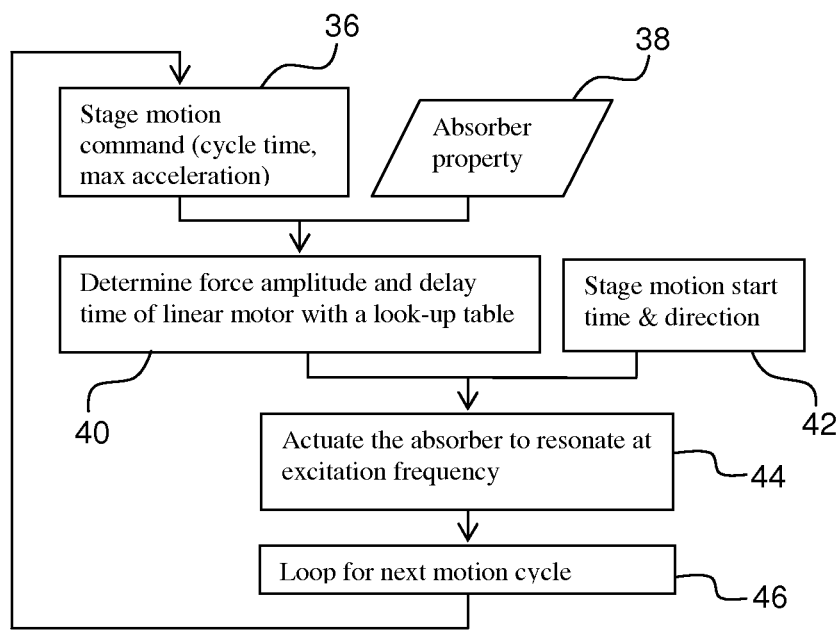
FIG. 4 is a flowchart illustrating a control scheme that is applicable for controlling the active vibration absorbers according to the preferred embodiments of the invention.

FIG. 4 is a flowchart illustrating a control scheme that is applicable for controlling the active vibration absorbers 10, 10' according to the preferred embodiments of the invention. The working principle and control scheme of the active vibration absorber 10 will be explained hereafter with reference to a processing station 22 in the form of a wire bonder (see FIG. 3).

First, the bonding cycle time (T) and maximum acceleration ($A_{max}$) of the x-y stage 30 are generated in a motion controller 36. This information is transmitted to a processor, which compares the information with the known properties of the active vibration absorber 38. Thereafter, an appropriate force amplitude (A) and delay time ($\Delta t$) that is required from the linear motor are determined with reference to a look-up table that was created during calibration or testing 40. A motion start time and a motion direction of the x-y stage are also determined 42.

Based on the aforesaid tuning parameters, a motion controller associated with the linear motor drives the linear motor to resonate with a sinusoidal or other oscillating signal at an excitation frequency 44. The period of this sinusoidal signal is approximately equal to a wire bonding cycle time, and the linear motor starts its motion with a predetermined time-delay after the start of the motion of the x-y stage 30. Accordingly, the active vibration absorber 10, 10' resonates at the excitation frequency of the motion of the x-y stage 30, and exerts a force on the processing machine 22 to cancel the reaction force of the x-y stage 30. Therefore, the vibration of the processing machine 22 is reduced. The aforesaid process is then repeated for the next motion cycle to conduct bonding 46.

Besides the configurations of active vibration absorbers 10, 10' described above, the processing machine 22 may also be mounted with a second single-axis active vibration absorber 10 which is oriented perpendicularly to the first single-axis active vibration absorber 10, and which is operative to attenuate vibrations along a second axis that is perpendicular to a first vibration attenuation axis. The pair of active vibration absorbers 10 would also be capable of reducing vibration in two orthogonal axes simultaneously. Further, more than one excitation frequency during operation is possible.

It should be appreciated that the active vibration absorber 10 according to the preferred embodiment of the invention may be tuned to a wide range of excitation frequencies and this tuning can be performed in real time. There is no need for sensors and complex data processing involved in controlling vibration attenuation during operation of the processing machine 22. As compared to the active vibration attenuators with feedback control of the prior art, the active vibration absorber 10 according to the preferred embodiment of the invention has a much shorter transient time and is more responsive to changes in excitation.

The active vibration absorber utilizes the inherent stiffness of the active vibration absorber 10, 10' for the purpose of dampening vibrations. The force required to drive the inertial mass is quite small compared to the forces experienced by the structure of the processing station 22, eg. the force actuator may need to produce less than 10% of the force from the primary system which is acting on the structure of the processing station 22. Thus, the active vibration absorber 10, 10' according to the preferred embodiment of the invention can be compact and produced at a relatively low cost.

The invention described herein is susceptible to variations, modifications and/or additions other than those specifically described and it is to be understood that the invention includes all such variations, modifications and/or additions which fall within the spirit and scope of the above description.

The invention claimed is:

1. An active vibration absorber for a semiconductor processing apparatus, the active vibration absorber comprising:
   a mounting portion that is attachable to a structure of a processing station of the semiconductor processing apparatus, the structure incorporating a positioning system which serves to vibrate the structure during its operation;
   an inertial mass that is resiliently coupled to the mounting portion;
   a force actuator which is operative to controllably move the inertial mass relative to the mounting portion; and
   a reference table responsive to motion commands which are given by the semiconductor processing apparatus;
   wherein the force actuator is configured to move the inertial mass relative to the mounting portion according to a motion profile during a motion cycle of the positioning system in order to attenuate vibrations in the structure, the motion profile being determined from the reference table based upon a motion command which is operative to drive the positioning system during the motion cycle.

2. The active vibration absorber as claimed in claim 1, wherein the force actuator is configured to move the inertial mass relative to the mounting body only along a single axis.

3. The active vibration absorber as claimed in claim 2, further comprising leaf springs for resiliently coupling the inertial mass to the mounting portion.

4. The active vibration absorber as claimed in claim 3, wherein one end portion of each leaf spring is affixed to the inertial mass and an opposite end portion of each leaf spring is affixed to the mounting portion to elastically support the inertial mass relative to the mounting portion.

5. The active vibration absorber as claimed in claim 1, wherein the force actuator is configured to move the inertial mass relative to the mounting portion along dual axes that are orthogonal to each other.

6. The active vibration absorber as claimed in claim 5, further comprising flexible columnar supports with substantially square cross-sections for resiliently coupling the inertial mass to the mounting portion.

7. The active vibration absorber as claimed in claim 6, wherein one end portion of each flexible columnar support is affixed to the inertial mass and an opposite end portion of each flexible columnar support is affixed to the mounting portion to elastically support the inertial mass relative to the mounting portion.

8. The active vibration absorber as claimed in claim 1, wherein the force actuator comprises a linear motor having a magnet and a coil that are movable relative to each other, one of the magnet and coil being attached to the inertial mass and the other being attached to the mounting portion.

9. The active vibration absorber as claimed in claim 8, wherein the linear motor is configured to drive the coil to move relative to the magnet in two axes along a plane.

10. The active vibration absorber as claimed in claim 1, wherein the force actuator is configured to drive the inertial mass to vibrate and oscillate at a desired frequency relative to the mounting portion.

11. The active vibration absorber as claimed in claim 10, wherein the inertial mass is driven to vibrate and oscillate according to a sinusoidal signal.

12. The active vibration absorber as claimed in claim 1, further comprising a processor which determines the required motion profile for moving the inertial mass relative to the mounting portion based upon an expected force that would be experienced by the structure caused by the motion command during the motion cycle.

13. The active vibration absorber as claimed in claim 12, wherein the motion profile includes a time delay between a start of a motion associated with the structure and movement of the inertial mass.

14. The active vibration absorber as claimed in claim 12, wherein the processor is operative to determine and adjust a force amplitude of the motion profile for actuation of the force actuator.

15. The active vibration absorber as claimed in claim 1, further comprising a reference table created during calibration of the active vibration absorber which is used for determination of a suitable motion profile of the active vibration absorber based upon various motion commands.

16. The active vibration absorber as claimed in claim 1, wherein the structure comprises a semiconductor wire bonder or a die bonder.

17. The active vibration absorber as claimed in claim 1, wherein the structure comprises a casting base on which the active vibration absorber is attached, and the casting base further rests on a resilient isolator which separates the casting base from a support platform for isolating the casting base from external vibrations.

18. The active vibration absorber as claimed in claim 1, wherein a period of motion of the force actuator is approximately equal to an operation cycle time of the positioning system.

19. A method for attenuating vibrations in a structure, comprising the steps of:
   attaching an active vibration absorber as claimed in claim 1 to the structure;
   receiving with a processor the motion command sent to the positioning system for driving the positioning system during the motion cycle;
   determining a motion profile of the inertial mass relative to the mounting portion; and thereafter
   controlling the inertial mass to move relative to the mounting portion according to the motion profile that has been determined.

20. A semiconductor processing apparatus, comprising:
   a processing station incorporating a positioning system which serves to vibrate the processing station during its operation;
   an active vibration absorber having a mounting portion that is attachable to the processing station and an inertial mass that is resiliently coupled to the mounting portion;
   a force actuator which is operative to controllably move the inertial mass relative to the mounting portion; and
   a reference table responsive to motion commands which are given by the semiconductor processing apparatus;
   wherein the force actuator is configured to move the inertial mass relative to the mounting portion according to a motion profile during a motion cycle of the positioning system in order to attenuate vibrations in the processing station, the motion profile being determined from the reference table based upon a motion command which is operative to drive the positioning system during the motion cycle.

* * * * *